United States Patent
Sugawara (10) Patent No.: US 7,149,790 B2
(45) Date of Patent: Dec. 12, 2006

(54) COMMUNICATION DEVICE FOR ENABLING FACSIMILE TRANSMISSION USING E-MAIL AND CONTROL METHOD THEREFOR

(75) Inventor: Naoki Sugawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 10/196,256

(22) Filed: Jul. 17, 2002

(65) Prior Publication Data

US 2004/0015552 A1    Jan. 22, 2004

(30) Foreign Application Priority Data

Jul. 23, 2001  (JP) .............................. 2001-221896
Jul. 3, 2002   (JP) .............................. 2002-194566

(51) Int. Cl.
    *G06F 15/13* (2006.01)
(52) U.S. Cl. ..................... 709/219; 709/206; 358/1.15
(58) Field of Classification Search ................ 709/206, 709/219; 358/1.15
    See application file for complete search history.

(56) References Cited

U.S. PATENT DOCUMENTS 6,775,026 B1 *  8/2004 Kato ....................... 358/1.15
2002/0026500 A1 *  2/2002 Kanefsky et al. ........... 709/219

FOREIGN PATENT DOCUMENTS

| JP | 06-350775 | 12/1994 |
| JP | 10-107943 | 4/1998 |
| JP | 10-171733 | 6/1998 |
| JP | 10-327307 | 12/1998 |
| JP | 2001-16249 | 1/2001 |
| JP | 2001-061036 | 3/2001 |

OTHER PUBLICATIONS

K. Kurigami, "PC Fan, Dreamweaver and Fireworks, Web Design Technique for Windows", Mainichi Communications, Inc., Jun. 19, 2001, pp. 115-130 (with its partial English-language translation).

* cited by examiner

*Primary Examiner*—Viet D. Vu
*Assistant Examiner*—Jinsong Hu
(74) *Attorney, Agent, or Firm*—Fitzpatrick, Cella, Harper & Scinto

(57) ABSTRACT

A server device for enabling to output contents of a homepage designated by an e-mail from a particular facsimile device and a control method therefor are disclosed. The server device according to the present invention checks whether there is a description of "URL=", which means acquisition of homepage data, in a body of a received e-mail destined for the facsimile device. If there is the description, the server device uses a URL described following the "URL=" to download the homepage data. Then the downloaded homepage data and contents of the e-mail are converted into the facsimile data, a calling is made via telephone lines to the facsimile device corresponding to a destination mail address to send the data.

22 Claims, 7 Drawing Sheets

COMMUNICATION DEVICE FOR ENABLING FACSIMILE TRANSMISSION USING E-MAIL AND CONTROL METHOD THEREFOR

FIELD OF THE INVENTION

The present invention relates to a communication device for enabling information transmission from an e-mail terminal to a predetermined facsimile device by converting an e-mail produced at the terminal which is capable of producing the e-mail (i.e. the e-mail terminal), such as a cellular phone, a personal digital assistant, a computer terminal and the like, into facsimile data and sending it to the predetermined facsimile device, a data transmission system using the communication device and a control method therefor.

BACKGROUND OF THE INVENTION

In recent years, as the Internet is used more commonly, the e-mail has been widely used. Though the e-mail terminal for producing, receiving the e-mail and the like were originally limited to the computer terminal, wide variety of terminals have been on their market such as the cellular phone, the personal digital assistant, i.e. PDA, and the like.

As means for electronically transmitting text information or image information, though the facsimile device has been widely used before popularization of the e-mail, it has been impossible to communicate between the e-mail terminal and the facsimile device due to some differences such as communication protocols and data formats.

However, recently, there have been other facsimile devices which accommodate an e-mail service provided by an ISP (Internet Service Provider) and the like. These facsimile devices read the image and send it to a facsimile server at the ISP along with an e-mail address of its destination. Then, the facsimile server at the ISP converts the received image data into an attachment file of the e-mail and sends it to the e-mail address of the e-mail terminal as the destination.

Conversely, the e-mail sent from the e-mail terminal to the facsimile device which accommodates the e-mail service is converted into a facsimile image at the facsimile server at the ISP, and then sent to the facsimile device which accommodates the e-mail service. When the facsimile device receives the e-mail, it may record the image data on a sheet of recording paper or display it at a display device, such as a LCD and the like, provided on the facsimile device.

Usage of the facsimile server and the facsimile device described above has enabled output of the text information included in the e-mail from the e-mail terminal onto the facsimile device. However, it has been impossible for the facsimile server and the facsimile device described above to send the information displayed at a "homepage" to the facsimile device from the e-mail terminal, which cannot be connected directly with a printer, in particular, such as the cellular phone, the personal digital assistant, and the like.

In this case, it has been necessary to use a personal computer and the like separately to display a desired homepage and send it by means of a facsimile modem, or to output the displayed image at the printer and read an output result at the facsimile device to send it.

However, in the above described manner, there has been a problem that it is not able to process the information only by the e-mail terminal itself, and in the case where the information is printed out and read at the facsimile to be sent, there also has been another problem that a quality of the image becomes degraded so that a detailed quality of the image, such as a map image, is difficult to read.

In addition, even in the case with the e-mail terminal which can be connected to the printer, such as some personal digital assistants, not only it is troublesome to connect the printer with it, but also it is difficult to use the printer when going out. So it has not been practical in terms of ease of use.

SUMMARY OF THE INVENTION

The present invention is made in view of such problems of prior arts. An object of the invention is to provide a communication device for enabling to output contents of a desired homepage from a destination facsimile device by sending an e-mail destined for the desired facsimile device from an e-mail terminal, and a control method therefor.

A communication device according to the present invention comprising: mail communication means for sending and receiving e-mails with a computer network; determination means for determining whether the received e-mail is destined for a facsimile device; URL determination means for determining whether or not there is any particular description meaning that a URL is designated in the e-mail, if the e-mail received from the computer network is destined for a facsimile device; data acquisition means for acquiring homepage information corresponding to the URL designated in the e-mail, if there is the particular description; data conversion means for converting both the homepage information into facsimile data and the contents of the e-mail into facsimile data; and sending means for sending the facsimile data converted by the data conversion means to a destination based on a destination address of the e-mail.

According to the present invention, a method for controlling a communication device, which is able to communicate via a computer network and telephone lines, comprising: a mail communication step of sending and receiving e-mails with the computer network; a determination step of determining whether the received e-mail is destined for a facsimile device; a URL determination step of determining whether or not there is any particular description meaning that a URL is designated in the e-mail, if the e-mail received from the computer network is destined for a facsimile device; a data acquisition step of acquiring homepage information corresponding to the URL designated in the e-mail, if there is the particular description; a data conversion step of converting both the homepage information into facsimile data and the contents of the e-mail into facsimile data; and a sending step of sending the facsimile data converted by the data conversion step to a destination based on a destination address of the e-mail.

According to the present invention, a computer program causing a computer device to function as a communication device, comprising the steps of: determination step of determining whether a received e-mail is destined for a facsimile device; URL determination step of determining whether or not there is any particular description meaning that a URL is designated in the e-mail, if the e-mail received from the computer network is destined for a facsimile device; data acquisition step of acquiring homepage information corresponding to the URL designated in the e-mail, if there is the particular description, and data conversion step of converting both the homepage information and the contents of the e-mail into facsimile data.

According to the present invention, an e-mail system comprising: mail communication means for sending and receiving e-mails with a computer network; determination means for whether the received e-mail is destined for a facsimile device; URL determination means for determining whether or not there is any particular description meaning that a URL is designated in the e-mail, if the e-mail received from the computer network is destined for a facsimile device; data acquisition means for acquiring homepage information corresponding to the URL designated in the e-mail, if there is the particular description; data conversion means for converting both the homepage information and the contents of the e-mail into facsimile data; and sending means for sending the facsimile data converted by the data conversion means to a destination based on a destination address of the e-mail.

According to the present invention, a communication device, comprising: mail communication unit adapted to send and receive e-mails with a computer network; determination unit adapted to determine whether the received e-mail is destined for a facsimile device; URL determination unit adapted to determine whether or not there is any particular description meaning that a URL is designated in the e-mail, if the e-mail received from the computer network is destined for a facsimile device; data acquisition unit adapted to acquire homepage information corresponding to the URL designated in the e-mail, if there is the particular description; data conversion unit adapted to convert both the homepage information and the contents of the e-mail into facsimile data; and sending unit adapted to send the facsimile data converted by the data conversion unit to a destination based on a destination address of the e-mail.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

The present invention will be described in detail based on its preferred embodiments with reference to the drawings. In the following description, terms "homepage", "homepage information" and "homepage data" mean information which are described in a markup language such as HTML, XML and the like, and identified by URLs (Uniform Resource Locaters). However, for simplification, the following description illustrates the case where the HTML is used as the markup language.

Figure 1:
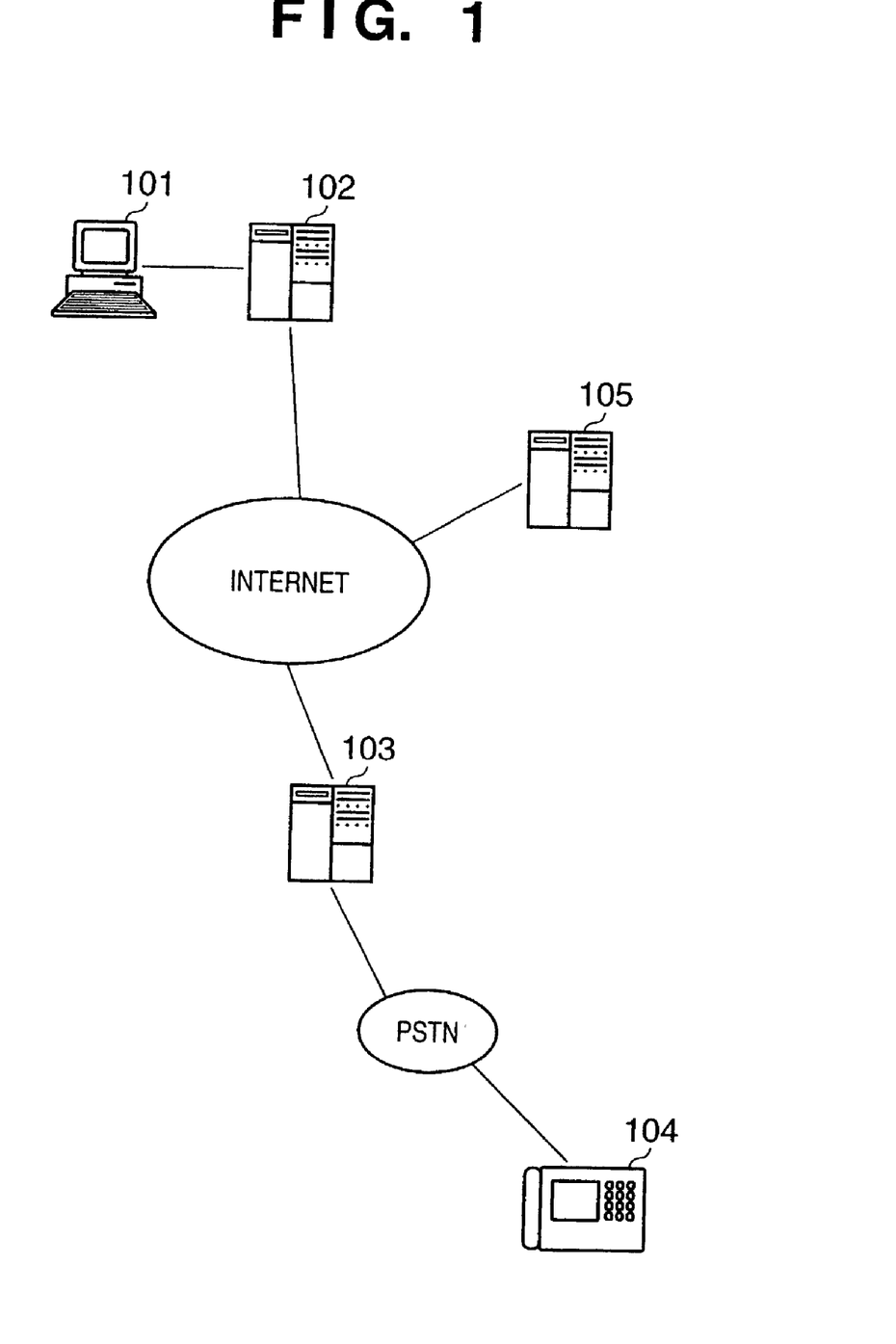
FIG. 1 shows an entire configuration example of a communication system using a server device according to an embodiment of the present invention.

FIG. 1 shows an entire configuration example of a communication system including a server device according to an embodiment of the present invention.

In the figure, a server device 103 is connected to the Internet and a public switched telephone network (PSTN), and has functions as an e-mail server, a WWW browser and a facsimile server. The server device 103 may be connected directly with the Internet, or may be connected to it via another network or a device not shown, such as an ISP and the like.

A terminal (e-mail terminal) 101, such as a computer terminal, a cellular phone having an e-mail transmission function, a PDA and the like, may transmit an e-mail via the Internet through a mail server 102, which is connected to the terminal 101 via a communication network not shown, such as a telephone network and the like.

A facsimile device 104 is connected through the PSTN to the server device 103. By means of a facsimile server function of the server device 103, the facsimile device 104 may transmit the e-mail by facsimile transmission with the server device 103.

Figure 2:
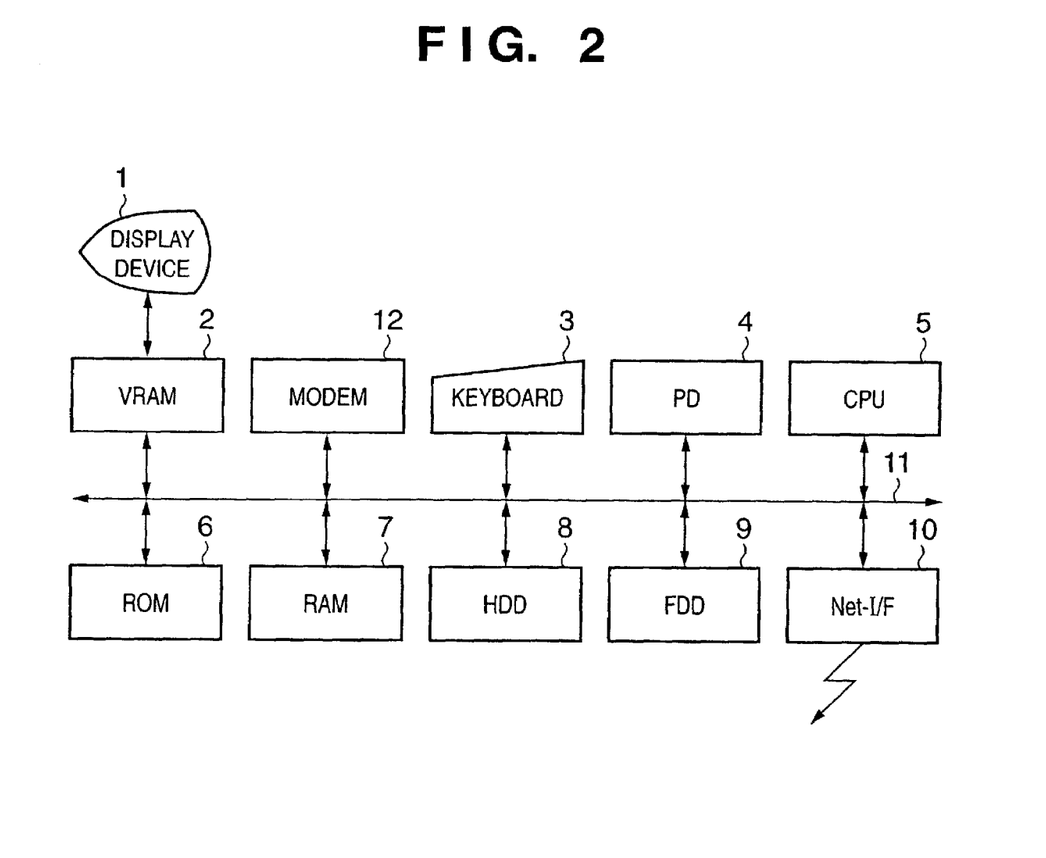
FIG. 2 is a block diagram showing a configuration example of the server device according to the embodiment of the present invention.

FIG. 2 is a block diagram showing a hardware configuration example of the server device 103. The server device 103 may be realized with a general purpose computer device having an interface connecting with the PSTN and the Internet.

In the figure, reference numeral 1 denotes a display device such as CRT, LCD and the like for displaying information on data under process by an application program, a variety of message menus and the like. Reference numeral 2 denotes a video RAM (hereinafter, referred to as VRAM) for expanding an image to be displayed at a screen of the display device 1. Reference numerals 3 and 4 denote a keyboard and a pointing device, respectively, which are used to input characters and the like in a predetermined area on the screen or to indicate an icon, a button or the like in a GUI provided by an OS or the application. Reference numeral 5 denotes a CPU for controlling the server device 103 totally.

Reference numeral 6 denotes a ROM for storing an operating process procedure (program) or data of the CPU 5. In addition to the OS for causing the general purpose computer device as shown to function as the server device 103 having functions as will be described, the application program and an error process program, the programs related to flowcharts as will be described are stored in the ROM 6 and/or a hard disk drive 8. Reference numeral 7 denotes a RAM to be used as a work area when the CPU 5 performs the variety of programs described above, and also as a temporary saving area in an error process.

Reference numerals 8 and 9 denote the hard disk drive (hereinafter, referred to as HDD) and a floppy disk drive (hereinafter, referred to as FDD), respectively, each disk thereof being used to store and read the application program or the data, a table, a library and the like as will be described. Instead of, or in addition to the FDD, an optical (magnetic) disk drive for a disk such as a CD-ROM, a MO, a DVD and the like, or a magnetic tape drive for a tape such as a tape streamer, a DDS and the like may also be provided.

Reference numeral 10 denotes a network interface for connecting the device to a computer network. Reference numeral 11 denotes an I/O bus, which consists of an address bus, a data bus and a control bus, for connecting each unit described above. Reference numeral 12 denotes a facsimile modem having the interface connecting to the PSTN. In the case where the server device 103 is connected, for example, indirectly with the Internet, and the like, other devices may also be connected between the network interface 10 and the Internet.

Next, a process in the server device 103 when sending the homepage information from the e-mail terminal 101 to the facsimile device 104 will be described using a flowchart of FIG. 3.

First, before the process in the server device 103 will be described, a procedure until the e-mail arrives at the server device 103 will be described. First, a user of the e-mail terminal 101 produces an e-mail. The e-mail is produced by producing a message by means of an e-mail software and the like operating on the terminal, in a known manner such as the keyboard, buttons on a telephone set, hand-written input and the like.

At the server device 103, if the e-mail may be determined as a standard mail and the homepage to be acquired may be identified, a message format for instructing the facsimile device to print the homepage from the e-mail terminal 101 may be set arbitrarily, however, in the following description, an e-mail address of a destination is to be described with the e-mail address corresponding to the facsimile device 104 as a receiver, and in a body, a URL of the homepage to be sent to a recipient is to be described following "URL=", for example, "URL=http://www.cano.xx.jp/index.html".

After the user produces the e-mail, the user instructs the e-mail terminal 101 to send the e-mail. In response to the instruction, the e-mail terminal 101 connects to the mail server 102 to send the e-mail by means of a mail transmission protocol, for example, a SMTP (Simple Mail Transfer Protocol).

The mail server 102 temporarily stores the received e-mail in an e-mail storage section (not shown) within the mail server 102. Then the mail server 102 fetches the e-mail stored in the e-mail storage section and sends the e-mail to the server device 103 corresponding to the designated address of the destination.

The process in the server device 103 will be described according to the flowchart of FIG. 3. As described above, an operation of the server device according to each of the embodiments of the present invention as will be described is realized by performing the program stored in the ROM 6 and/or the HDD 8 and controlling each component of the server device by the CPU 5 shown in FIG. 2.

The server device 103 stores the e-mail in the mail storage section, for example, realized as a predetermined area of the HDD 8. The mail storage section is managed as an individual area for each mail address. The server device 103 also has a function of determining whether the mail address is corresponding to the facsimile device or whether it is corresponding to the other standard terminal, according to a previously registered table and the like, to determine that the e-mail is destined for the facsimile device.

It will be appreciated that the above described determining function is not required if the above described server device 103 is used as a server device managing only the mail destined for the facsimile device. Also, it may be determined that the mail is destined for the facsimile device, in another arbitrary manner, such as by constituting the device to use different domain names between the mail destined for the facsimile device and the mail destined for the other standard terminal, and the like, to determine that the mail is destined for the facsimile device from the domain name of the received mail. By means of such a determining function and the like, if it is determined that the e-mail is destined for the facsimile device, the following process is performed.

The server device 103 checks, for example, an area corresponding to the facsimile device 104 in the mail storage section (step S201). The server device determines whether the mail destination is destined for a facsimile device (step S202). If a new e-mail destined for the facsimile device 104 has been received, the server device 103 retrieves a description of "URL=", which means the URL has been designated, in the body of the e-mail for determining if the description exists therein (step S202). If the mail is destined for no facsimile device, the server 103 performs the transmission of the mail received as a typical e-mail destined for a typical terminal (step S204).

As a result from the retrieval, if the description of "URL=" exists therein (step S205), a string following "URL=" (an actual URL) is fetched therefrom (step S208). Then, for example, by asking for an IP address corresponding to the domain name of the URL fetched into a DNS server, it is checked if the URL designated in the mail (in the strict sense, a server corresponding to the domain name of the URL) exists or not (step S209).

If the IP address can be normally acquired from the DNS server, similarly as with a known WWW browser software, HTML data of the homepage is downloaded from a WWW server (for example, a WWW server 105 in FIG. 1) corresponding to the URL by means of the HTTP (Hyper Text Transfer Protocol) (step S210). Then the received HTML data is interpreted, necessary files are acquired, and a page is constructed. This operation is equivalent to an operation of displaying the page in the known WWW browser software.

Next, the constructed page is converted into facsimile data (step S211). Specifically, the page data is expanded into bitmap data, and the bitmap data is compressed and encoded in a format such as MH, MR, MMR and the like which conforms to a known facsimile transmission procedure, such as T.30 and the like. Then, a telephone number of the facsimile device 104 is acquired, which has been previously registered to be associated with the destination mail address of the e-mail, and a calling is made via the facsimile modem 12 to the PSTN. Then, the server device 103 communicates with the facsimile device 104 according to the facsimile procedure, for example T.30, and sends the data of the homepage (step S212). Instead of performing step S212, step S312, later-described, may be performed.

In this case, not only the data of the homepage, but also the information may be included in the page or a header or a footer section to be sent, such as the mail address of a sender, a title of the message, transmission date and time, the URL of the page printed, and the like.

The process of converting the constructed page into the facsimile data and sending it to the receiving facsimile device may be realized by using known arts such as a facsimile software and the facsimile modem, and the like.

In step S207, if it is determined that the homepage does not exist, such as in the case where the IP address corresponding to the domain of the fetched URL cannot be acquired and the like, nothing is sent to the facsimile device 104, and an e-mail having a predetermined error message (for example, "http://www.cano.xx.jp/index.html does not exist") is produced to be sent to the e-mail terminal 101 (step S213).

In step S203, if the description of "URL=" does not exist, the e-mail is determined to be the standard one, text data of the e-mail is converted into image data, such as the bitmap data and the like, and then into the facsimile data format (step S206), and the data is sent to the facsimile device 104 according to the facsimile procedure, for example T.30 (step S207).

In this way, the server device according to the present embodiment, the particular description including the URL is detected, which is included in the e-mail destined for the facsimile device, and the homepage data designated by the URL is converted into the facsimile data to be sent. Thereby it is possible to output the image of a desired homepage from a desired facsimile device only by sending a simple e-mail from the e-mail terminal.

If the homepage represented with the URL included in the particular description does not exist, the e-mail may be returned, which states that the homepage information cannot be sent to the e-mail terminal, to inform the sender of the e-mail that the URL does not exist.

[Second Embodiment]

Figure 4:
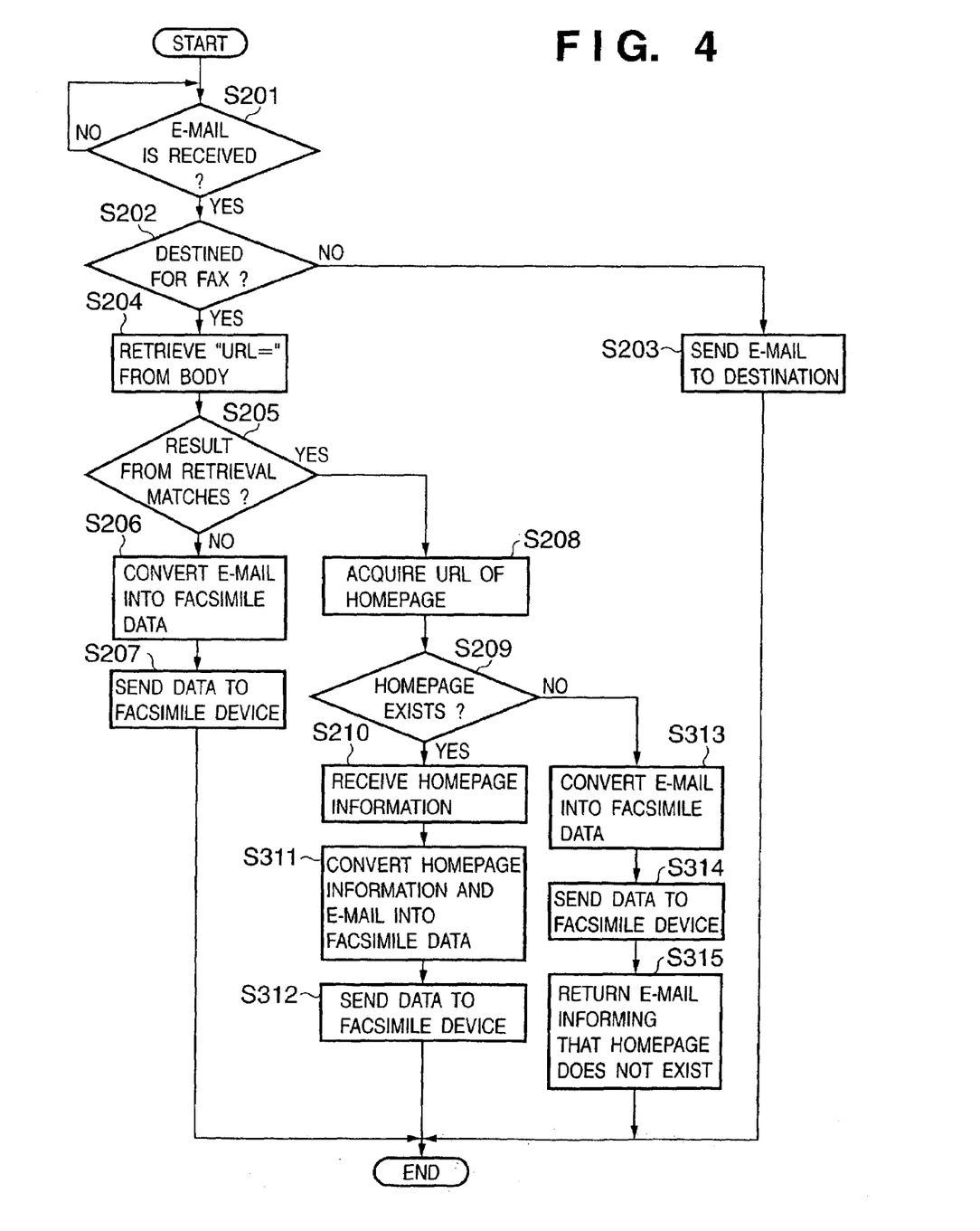
FIG. 4 is a flowchart representing the process in the server device according to Second Embodiment of the present invention.

In First Embodiment, the server device has been described wherein the data of the homepage designated in the e-mail is acquired, converted into the facsimile data and sent into the facsimile device. A server device according to the present embodiment is characterized in that it converts not only the data of the homepage designated in the e-mail, but also the e-mail itself into the facsimile data to send to the facsimile device. The server device is also characterized in not only that if the designated homepage does not exist, it replies the e-mail terminal informing that, but also that it send the original e-mail to the facsimile device.

Next, the operation of the server device according to Second Embodiment will be described using a flowchart of FIG. 4. In the same process as the process described in FIG. 3, the same reference numerals are attached and the description thereof is omitted.

The process of receiving an e-mail, retrieving "URL=" and the process to be performed if "URL=" is not found, and the process after "URL=" is found and until the existence of a homepage is confirmed (steps S201 to S209) are the same as First Embodiment.

In step S209, if it is determined that the homepage exists, similarly as with the known WWW browser software, HTML data of the homepage is downloaded from a WWW server (for example, the WWW server 105 in FIG. 1) corresponding to the URL by means of the HTTP (Hyper Text Transfer Protocol) (step S210). Then the received HTML data is interpreted, necessary files are acquired, and a page is constructed. This operation is equivalent to the operation of displaying the page in the known WWW browser software.

Next, the constructed page and the received e-mail, in which the URL is designated, are converted into facsimile data (step S311). Specifically, the page data is expanded into bitmap data, and the bitmap data is compressed and encoded in a format such as MH, MR, MMR and the like which conforms to the known facsimile transmission procedure, such as T.30 and the like. Then, a telephone number of the facsimile device 104 is acquired, which has been previously registered to be associated with the destination mail address of the e-mail, and a calling is made via the facsimile modem 12 to the PSTN. Then, the server device 103 communicates with the facsimile device 104 according to the facsimile procedure, for example T.30, and sends the data of the homepage and the received e-mail in a single communication (step S212). The term "single communication" in this specification means that keeping on the communication without disconnecting the acquired communication line. Thereby it ensures that not only contents of the homepage but also those of the e-mail are communicated to the user of the facsimile. Here, the contents of the e-mail is sent prior to the sending of contents of the homepage. Thus, a communication document or the like is sent in advance, and, therefore, it is easy for the user of the facsimile to understand the meaning of the homepage information. While the data transmission of homepage and received e-mail in a single communication has been described, another communication method can also be used.

Therefore, as the received e-mail itself is converted into the facsimile data to be sent, even if "URL=" is designated in the e-mail having a text information, not only the contents of the homepage but also those of the e-mail are outputted from the facsimile device. Since both the contents of e-mail and contents of homepage are sent in a single communication, it is easy to understand the association between the mail and the homepage information.

In step S209, if it is determined that the homepage of the URL designated in the received e-mail does not exist, the received e-mail is converted into the facsimile data similarly as steps S206 to S207 (step S313), and sent to the facsimile device 104 (step S314). Thereby even if the homepage of the designated URL does not exist, it ensures that the contents of the e-mail are communicated to the user of the facsimile. In addition, if an e-mail having an error message is converted into the facsimile data so that it is sent to the facsimile device 104, the user received the facsimile also understands that the URL has been designated of which the homepage does not exist. Then, similarly as step S211, the e-mail having the error message is sent to the e-mail terminal 101 (step S315).

[Modification to the Second Embodiment]

Though in Second Embodiment, the case has been described where the processes in both step S311 and steps S313 to S315 are performed, it is also possible to constitute to perform only any one of the processes such that step S211 in First Embodiment is performed instead of step S311, the step S213 in First Embodiment is performed instead of the process in steps S313 to S315, or the like.

[Third Embodiment]

Figure 5:
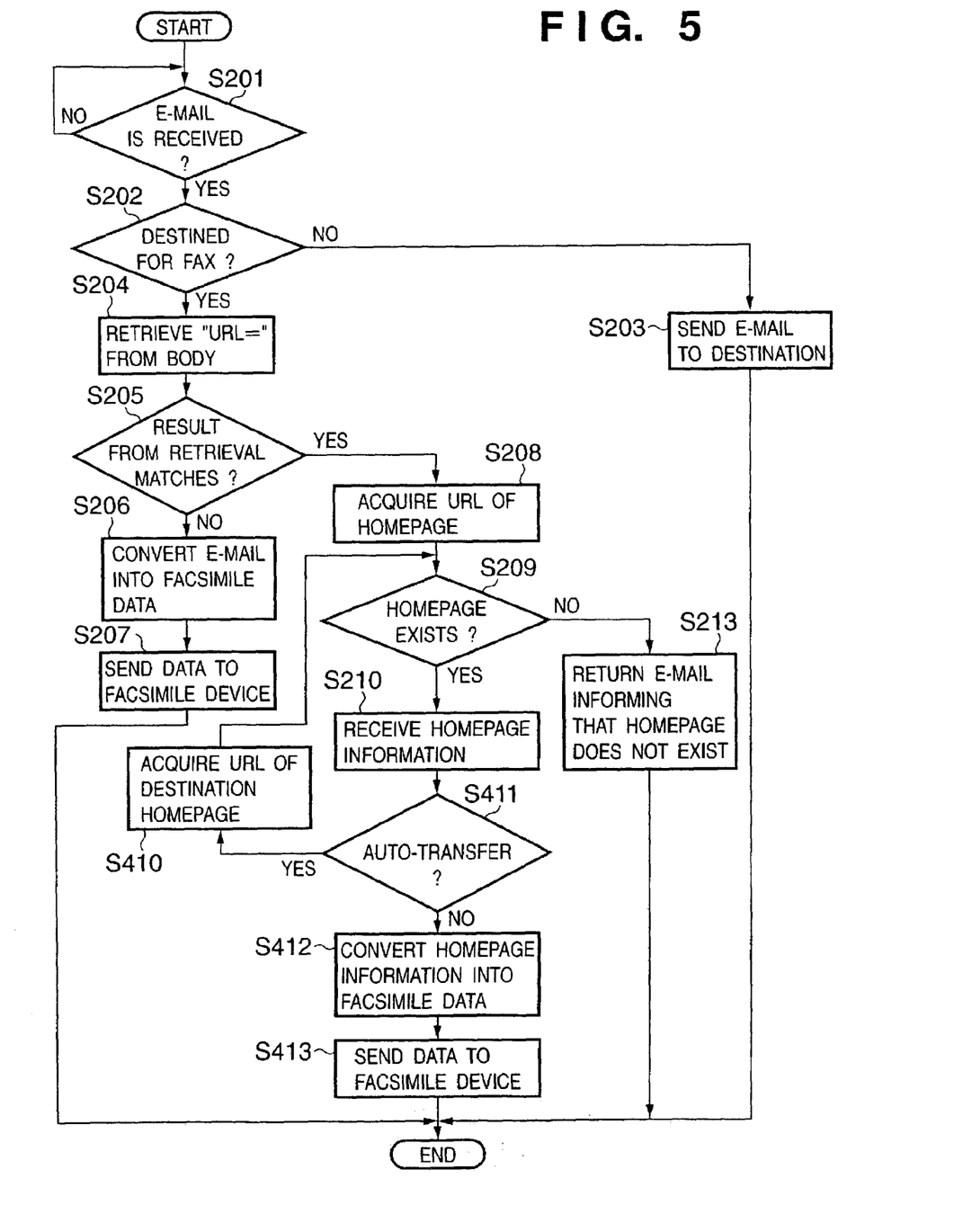
FIG. 5 is a flowchart representing the process in the server device according to Third Embodiment of the present invention.

Next, the operation of the server device according to Third Embodiment of the present invention will be described using a flowchart of FIG. 5. A server device according to the present embodiment is characterized in that when homepage data is acquired, if information of redirection (auto-transfer) to another page is included therein, the homepage data of destination is acquired.

Figure 3:
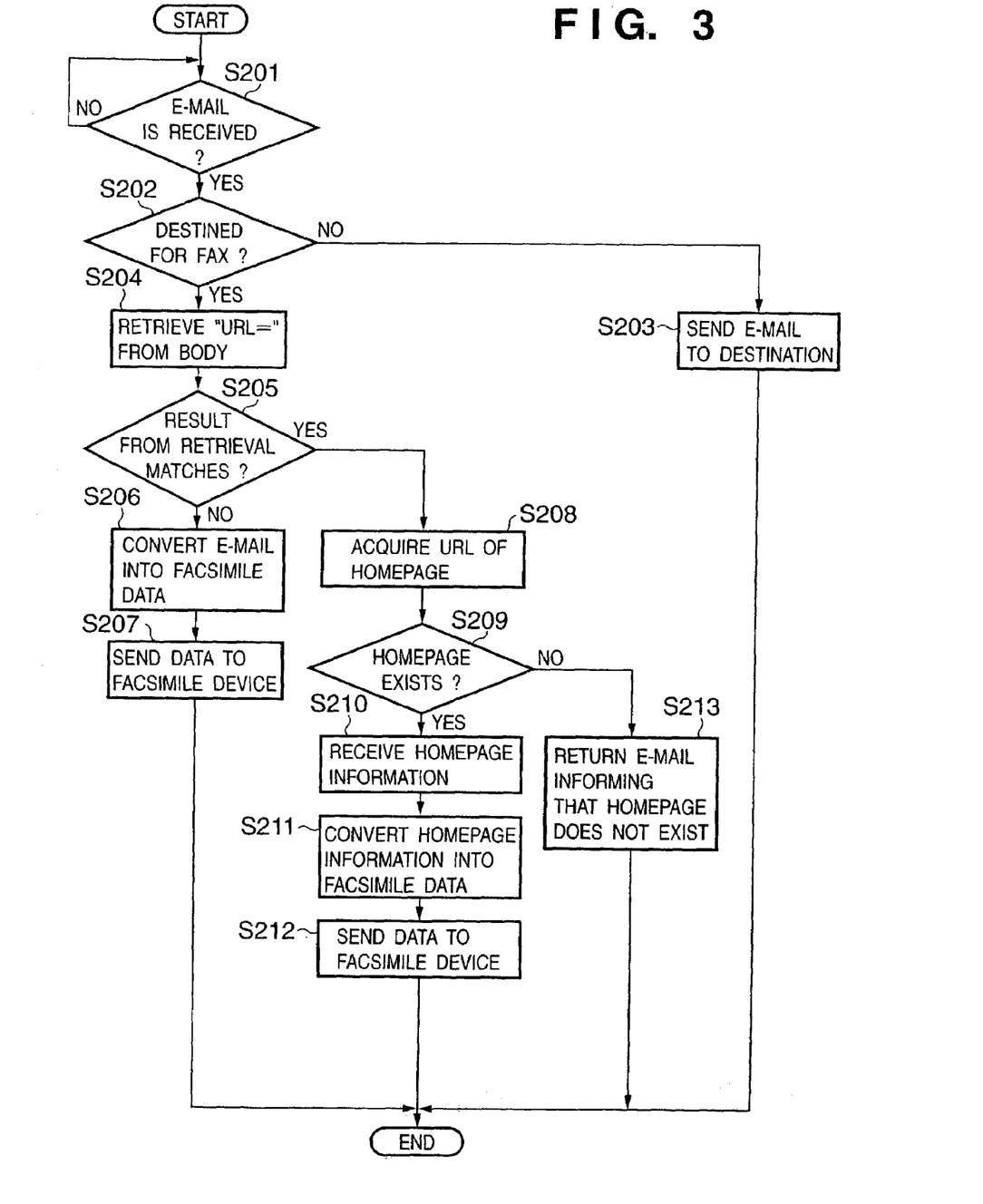
FIG. 3 is a flowchart representing a process in the server device according to First Embodiment of the present invention.

Also in the present embodiment, as to the same process as the process described in FIG. 3, the same reference numerals are attached and the description thereof is omitted.

The process of receiving an e-mail, retrieving "URL=" and the process to be performed if "URL=" is not found, and the process after "URL=" is found and until the existence of a homepage is confirmed (steps S201 to S209) are the same as First Embodiment.

In step S209, if it is determined that the homepage exists, similarly as with the known WWW browser software, HTML data of the homepage is downloaded from a WWW server (for example, the WWW server 105 in FIG. 1) corresponding to the URL by means of the HTTP (Hyper Text Transfer Protocol) (step S210).

It is checked whether there is a description for automatically transferring the homepage in the downloaded HTML data (such as<meta http-equiv="Refresh" content="5; url=info/index.html">) (step S411). If there is the description, URL data of the destination ("http://www.cano.xx.jp/info/index.html") is also acquired (step S412), and the process returns to step S209 and the HTML data of the destination is downloaded.

Then the received HTML data is interpreted, necessary files are acquired, and a page is constructed. This operation is equivalent to the operation of displaying the page in the known WWW browser software.

Next, similarly as First Embodiment, the homepage data is converted into facsimile data (step S211), and sent to the facsimile device 104 according to a facsimile procedure of T.30 (step S212). Thereby, even if the homepage of the designated URL has been modified, it ensures that information of the indicated homepage is automatically communicated to the user of the facsimile without intervention of the user sending the e-mail.

In step S209, if it is determined that the homepage of the fetched URL does not exist, nothing is sent to the facsimile device 104, and an e-mail having an error message is produced to be sent to the e-mail terminal 101 (step S213), similarly to First Embodiment.

In addition, as to the homepage data to be converted into the facsimile data in step S211, it may be both of the page of the URL designated in the received e-mail and another page transferred from the page, or it may be only the page data after the transfer. Also, similarly as step S311 in Second Embodiment, the e-mail in addition to the homepage data may be converted into the facsimile data to be sent in a single communication. Thus, it is ensured that not only the contents of the homepage, but also the contents of the e-mail are communicated to the user of the facsimile. Here, the contents of the e-mail is sent prior to the sending of contents of the homepage. Thus, a communication document or the like is sent in advance, and, therefore, it is easy for the user of the facsimile to understand the meaning of the homepage information. While the data transmission of homepage and received e-mail in a single communication has been described, another communication method can be used. Similarly, if it is determined that the homepage does not exist in step S209, steps S313 to S315 in Second Embodiment may be performed instead of the process in step S213.

[Forth Embodiment]

Figure 6:
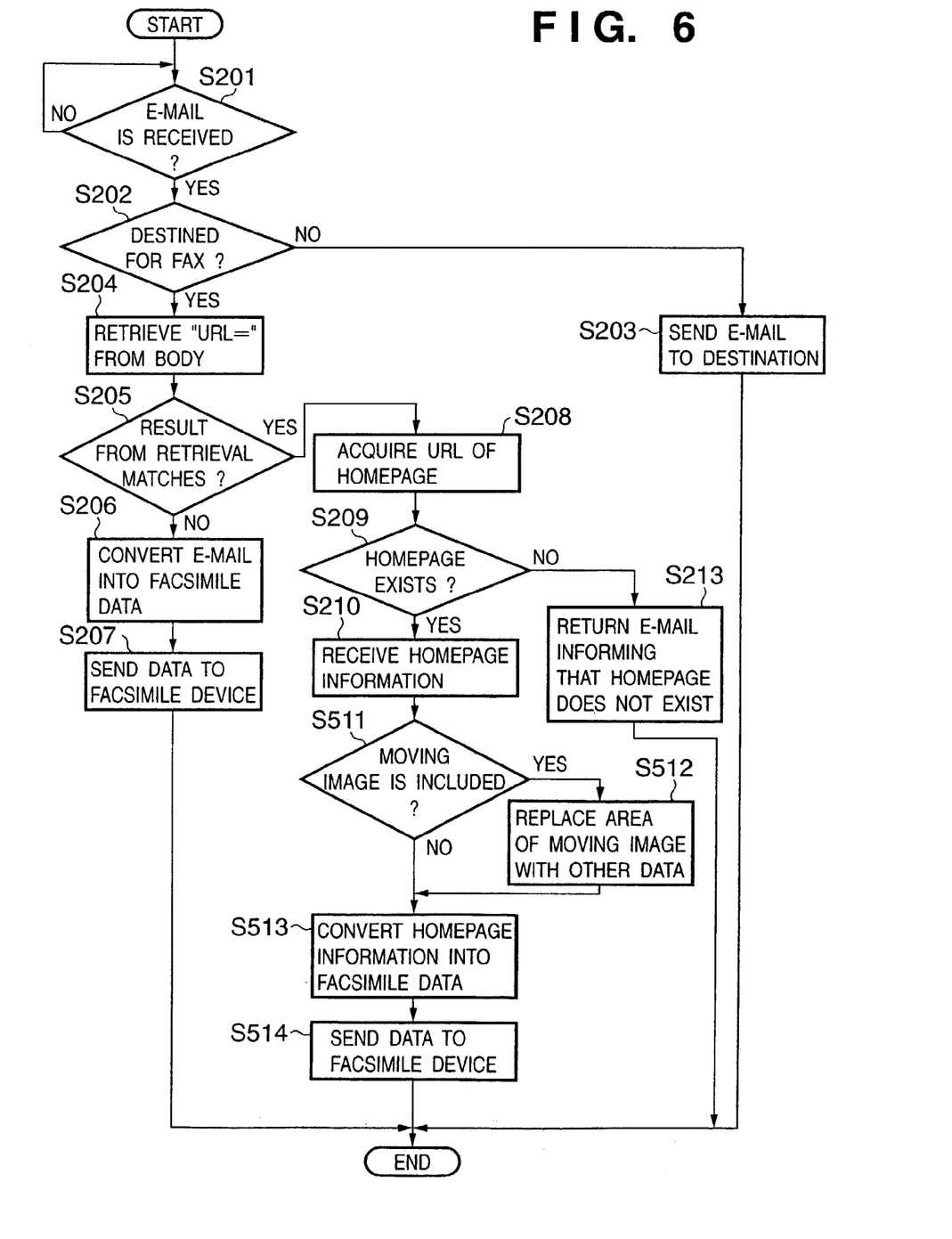
FIG. 6 is a flowchart representing the process in the server device according to Forth Embodiment of the present invention.

Next, the operation of the server device according to Forth Embodiment of the present invention will be described using a flowchart of FIG. 6. A server device according to the present embodiment is characterized in that when homepage data is acquired, if data such as moving image data or sound data is included therein, which cannot be converted into facsimile data or is not suitable to be converted into the facsimile data, or if a preset type of data is included therein, the page data is processed.

Also in the present embodiment, as to the same process as the process described in FIG. 3, the same reference numerals are attached and the description thereof is omitted.

The process of receiving an e-mail, retrieving "URL=" and the process to be performed if "URL=" is not found, and the process after "URL=" is found and until the existence of a homepage is confirmed (steps S201 to S209) are the same as First Embodiment.

In step S209, if it is determined that the homepage exists, similarly as with the known WWW browser software, HTML data of the homepage is downloaded from a WWW server (for example, the WWW server 105 in FIG. 1) corresponding to the URL by means of the HTTP (Hyper Text Transfer Protocol) (step S210).

It is checked whether there is a description for downloading a moving image in the downloaded HTML data (such as<object classid="java:a.class" codetype="application/java"></object>) (step S511). If there is the description, the data is not downloaded, and an area for displaying the moving image in the page is replaced with other data (step S512). This other data can be a still image of, e.g., the moving image to be replaced. While the case where no downloading is performed has been described, downloading can also be performed, or the data can also be deleted and replaced by another data without the conversion to facsimile data.

In this case, as described above, as to the description to be checked in step S511, it may be not only a description for downloading the moving image, but also another arbitrary description may be included such as a description for downloading the data which requires a dedicated software (a browser plug-in) to display it, a description for downloading the sound data or the like. It will be appreciated that the data which is not displayed on the page, such as the sound data, is just not downloaded, and the process of replacing it with the other data is not required.

Though the data used for replacement of the area in step S512 may be arbitrarily set, it is convenient if it may be determined what is to be originally displayed at the area based on an output result at the facsimile device. So if the moving image is not downloaded, the display area for the moving image is preferably replaced with the image data having information indicating a category of the data of "moving image". The other type of data may be similarly processed.

Then, the page is constituted with the data except that of the type not to be downloaded, by acquiring necessary files. This operation is equivalent to the operation of displaying the page in the known WWW browser software.

Next, similarly as First Embodiment, the homepage data is converted into facsimile data (step S211), and sent to the facsimile device 104 according to a facsimile procedure of T.30 (step S212).

In step S209, if it is determined that the homepage of the fetched URL does not exist, nothing is sent to the facsimile device 104, and an e-mail having an error message is produced to be sent to the e-mail terminal 101 (step S213), similarly to First Embodiment.

In addition, as to the homepage data to be converted into the facsimile data in step S211, similarly as step S311 in Second Embodiment, the e-mail in addition to the homepage data may be converted into the same facsimile data to be sent. Thus, it is ensured that not only the contents of the homepage, but also the contents of the e-mail are communicated to the user of the facsimile. Here, the contents of the e-mail is sent prior to the sending of contents of the homepage. Thus, a communication document or the like is sent in advance, and, therefore, it is easy for the user of the facsimile to understand the meaning of the homepage information. While the data transmission of homepage and received e-mail in a single communication has been described, another communication method can be used.

Similarly, if it is determined that the homepage does not exist in step S209, steps S313 to S315 in Second Embodiment may be performed instead of the process in step S209.

[Fifth Embodiment]

Figure 7:
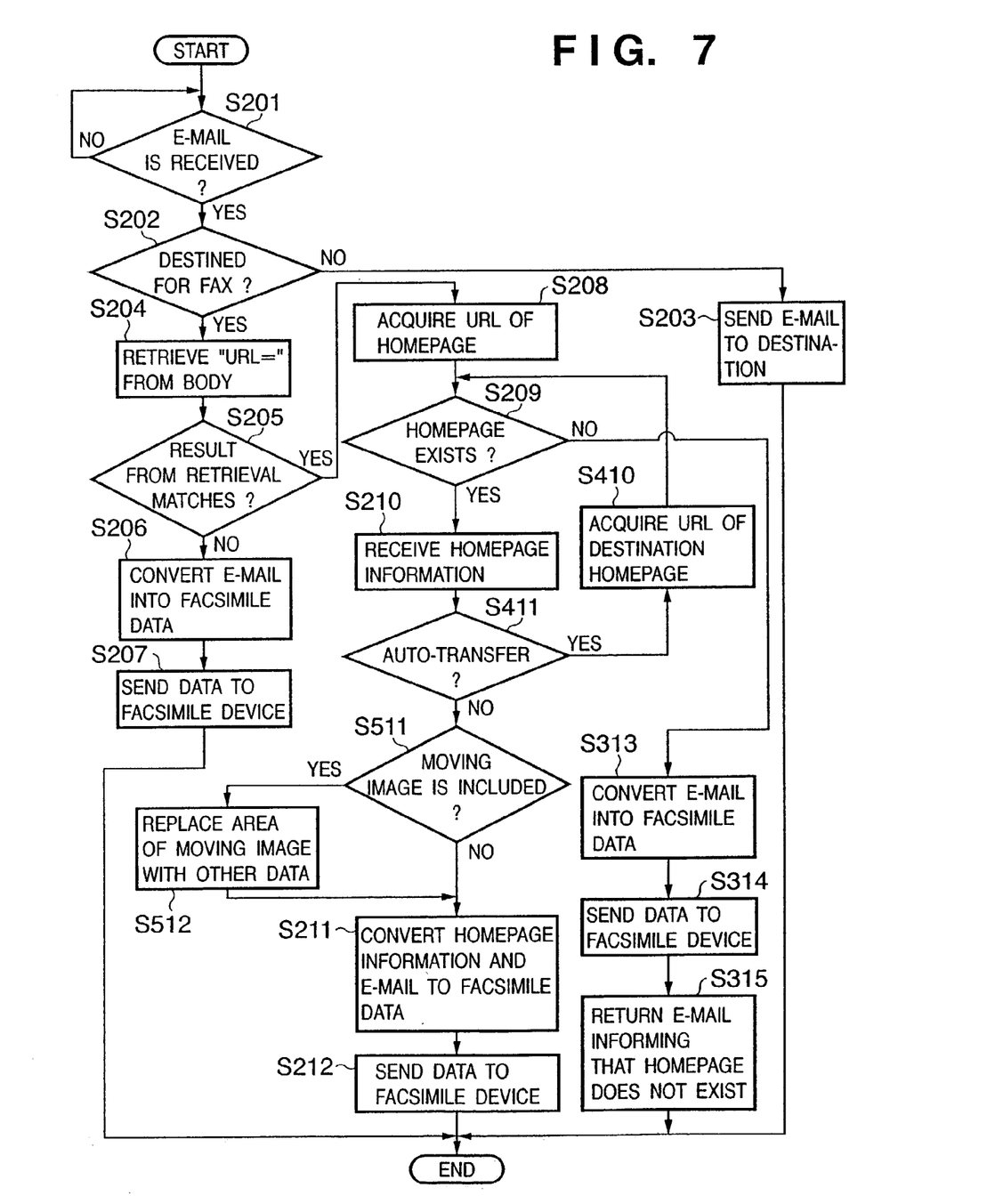
FIG. 7 is a flowchart representing the process in the server device according to Fifth Embodiment of the present invention.

Though it is possible to combine the above described Second, Third and Forth Embodiments arbitrarily, a flowchart of FIG. 7 shows the operation of the server device in the case where all the embodiments are combined together. In FIG. 7, reference numeral of each step is described identically with a corresponding process step in each embodiment. Since the detailed process in each step has been described in the above each embodiment, the description thereof is omitted. By constituting according to Fifth Embodiment, it is possible to output the contents of a desired homepage from the destination facsimile device, while the users of sending and receiving terminals may be informed quickly if the corresponding homepage does not exist, and the information may be communicated quickly to the user of the receiving terminal even if there is any information which cannot be expanded therein. Therefore, it may provide a device that is very easy to use.

OTHER EMBODIMENTS

In the above described embodiments, though the server 103 has the functions of both of the e-mail server and the facsimile server, it also may be constituted with the devices independent of each other. The homepage data may be sent from the server device 103 to the facsimile device 104 by means of a color transmission.

In addition, in the above described embodiments, though the process in the case where an error occurs in downloading the homepage data is not described, any arbitrary error process may be performed.

For example, as to the image which cannot be downloaded due to a link error and the like, or the image which has not been downloaded completely within a predetermined time period, the area corresponding to the image which cannot be downloaded may also be replaced with the other image to be processed, similarly with the case of processing the moving image in Forth Embodiment. In this case, the image data to be used for the replacement preferably includes information indicating the contents of the error (for example, the message of "the image data does not exist", "the image could not be downloaded within a predetermined time period", and the like).

Furthermore, in the above described embodiments, it is determined whether a string "URL=" exists or not in the e-mail destined for the facsimile device to determine whether it is the e-mail meaning acquisition of the homepage data or the standard e-mail. However, other determination method except that may also be used.

For example, it also may be constituted such that a command is described in a line immediately prior to "URL=" so that the command gives the server device some indications, including whether or not it is required to acquire and send the page corresponding the URL following "URL=" in the body. In this case, the server device according to the present invention is constituted to retrieve and interpret not only "URL=" in the body but also the command to perform the corresponding operation.

Particularly, given that the "PRINT" is a command meaning page acquisition and transmission, and "NOPRINT" is a command meaning the page acquisition and that no transmission is required, by describing in the body that:

PRINT
URL=http://www.cano.xx.jp/index.html,
the acquisition and transmission of the page data in http://www.cano.xx.jp/index.html are performed similarly as each embodiment described above. On the other hand, by describing in the body that:

NOPRINT
URL=http://www.cano.xx.jp/index.html,
the acquisition and transmission of the page data are not performed.

Thus, usage of the command enables control for each URL in the e-mail as desired by the user.

In addition, in the above described embodiments, though the case where the present invention is embodied in the server device 103, it also may be a device which performs the operation as showed in the above embodiments with respect to the server device 102. That is, similarly to case with the server device 103, it is determined whether the e-mail address of the destination is corresponding to the facsimile device or any other standard terminal. If it is corresponding to the facsimile device, the information of the designated URL is acquired, the homepage information and/or e-mail information is converted into the facsimile information, the facsimile information is converted in a format of an attachment file of the e-mail, and the information is attached to the e-mail and sent to the server device 103.

The server device 103 also may fetch the facsimile information in the attachment file from the information including the attachment file of the received e-mail, expand and send it to the facsimile device 104. In addition, the process may be shared between the server device 102 and the server device 103 (for example, the process is performed at the server device 102 until the homepage information is acquired, the acquired information and the e-mail information are sent to the server device 103, and then the server 103 converts the information into the facsimile information to send it to the facsimile device 104), and the process according to the present invention also may be realized as an entire e-mail system.

Furthermore, the object of the present invention is also achieved by performing a storage medium having stored a program code of software enabling the functions of the above described embodiments by reading the program code stored in the storage medium by a system or a computer of the device (or CPU or MPU).

In this case, since the program code read out of the storage medium enables the functions of the above described embodiments by itself, it means that the storage medium having stored the program code constitutes the present invention.

As the storage medium for providing the program code, for example, a floppy disk, a hard disk, an optical disk, a magneto-optical disk, a CD-ROM, a CD-R, a magnetic tape, a nonvolatile memory card, a ROM and the like may be used.

In addition, the functions of the above described embodiments are realized not only by performing the program code read by the computer, but also by performing all or a part of the actual process by an OS (operating system) operating on the computer and the like.

Furthermore, the functions of the above described embodiments are also realized in the case where, after the program code read out of the storage medium is written in a memory provided in a function enhancement board inserted the computer or in a function enhancement unit connected to the computer, all or a part of the actual process are performed by the CPU and the like provided in the function enhancement board or the function enhancement unit, based on instructions of the program code.

If the present invention is applied to the above storage medium, at least the program code corresponding to the process described in the above described flowcharts (shown in one of more of FIG. 3 through FIG. 7) and the other embodiments is stored in the storage medium.

As described above, the server device according to the present invention, it is possible to output contents of a desired homepage from a destination facsimile device by sending an e-mail destined for the desired facsimile device from an e-mail terminal.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A communication device, comprising:
   mail communication means for sending and receiving e-mails with a computer network;
   determination means for determining whether a received e-mail is destined for a facsimile device;
   URL determination means for determining whether or not there is any particular description meaning that a URL is designated in the e-mail, if said e-mail received from said computer network is determined by the determination means as being destined for a facsimile device;
   data acquisition means for acquiring homepage information corresponding to the URL designated in the e-mail, if there is said particular description in the e-mail;
   data conversion means for converting both the homepage information into facsimile data and contents of the e-mail into facsimile data; and
   sending means for sending the facsimile data converted by said data conversion means to a destination based on a destination address of said e-mail,
   wherein said data acquisition means comprises:
   page existence confirmation means for detecting whether or not a homepage corresponding to said URL exists, and if said homepage does exist, said data conversion means converts the contents of the e-mail designating the URL corresponding to said homepage and the contents of said homepage into the facsimile data, and said sending means sends the facsimile data converted from the e-mail and said homepage to the destination based on the destination address of the e-mail, and if said homepage does not exist, said data conversion means converts the contents of the e-mail designating the URL corresponding to said homepage into the facsimile data, and said sending means sends the facsimile data converted from the e-mail to the destination based on the destination address of the e-mail.

2. The communication device according to claim 1, wherein if said e-mail is destined for the facsimile device and does not include said particular description, said data conversion means converts the contents of said e-mail into the facsimile data.

3. The communication device according to claim 1, wherein if the acquired homepage information includes a description having the URL of an auto-transfer destination, said data acquisition means acquires the homepage information on said auto-transfer destination.

4. The communication device according to claim 1, wherein if the acquired homepage information includes a description indicating that data in a predetermined format should be downloaded, said data acquisition means does not convert said data in the predetermined format to facsimile data.

5. The communication device according to claim 4, wherein if said data in said predetermined format is moving image data, said data acquisition means replaces an area of said moving image data with still image data.

6. The communication device according to claim 5, wherein the still image data includes information indicating a data type prior to the replacement.

7. The communication device according to claim 1, wherein said sending means includes facsimile communication means for sending said facsimile data to the facsimile device corresponding to the destination address of the e-mail including said particular description via telephone lines.

8. A method for controlling a communication device, which is able to communicate via a computer network and telephone lines, comprising:
   a mail communication step of sending and receiving e-mails with said computer network;
   a determination step of determining whether a received e-mail is destined for a facsimile device;
   a URL determination step of determining whether or not there is any particular description meaning that a URL is designated in the e-mail, if said e-mail received from said computer network is destined for a facsimile device;
   a data acquisition step of acquiring homepage information corresponding to the URL designated in the e-mail, if there is said particular description in the e-mail;
   a data conversion step of converting both the homepage information into facsimile data and contents of the e-mail into facsimile data; and
   a sending step of sending the facsimile data converted by said data conversion step to a destination based on a destination address of said e-mail,
   wherein said data acquisition step comprises:
   a page existence confirmation step of detecting whether or not a homepage corresponding to said URL exists, and if said homepage does exist, said data conversion step converts the contents of the e-mail designating the URL corresponding to said homepage and the contents of said homepage into the facsimile data, and said sending step sends the facsimile data converted from the e-mail and said homepage to the destination based on the destination address of the e-mail, and if said homepage does not exist, said data conversion step converts the contents of the e-mail designating the URL corresponding to said homepage into the facsimile data, and said sending step sends the facsimile data converted from the e-mail to the destination based on the destination address of the e-mail.

9. The method for controlling a communication device according to claim 8, wherein if said e-mail is destined for the facsimile device and does not include said particular description, said data conversion step converts the contents of said e-mail into the facsimile data.

10. The method controlling a communication device according to claim 8, wherein if the acquired homepage information includes a description having the URL of an auto-transfer destination, said data acquisition step acquires the homepage information on said auto-transfer destination.

11. The method for controlling a communication device according to claim 8, wherein if the acquired homepage information includes a description indicating that data in a predetermined format should be downloaded, said data acquisition step does not convert said data in the predetermined format to facsimile data.

12. The method for controlling a communication device according to claim 11, wherein if said data in said predetermined format is moving image data, said data acquisition step replaces an area of said moving image data with still image data.

13. The method for controlling a communication device according to claim 12, wherein said still image data includes information indicating a data type prior to the replacement.

14. The method for controlling a communication device according to claim 8, wherein said sending step includes a facsimile communication step for sending said facsimile data to the facsimile device coffesponding to the destination address of the e-mail including said particular description via telephone lines.

15. A computer-executable program stored on a computer-readable medium, the program comprising computer-executable code for a method for controlling a communication device, which is able to communicate via a computer network and telephone lines, comprising:
a mail communication step of sending and receiving e-mails with said computer network;
a determination step of determining whether a received e-mail is destined for a facsimile device;
a URL determination step of determining whether or not there is any particular description meaning that a URL is designated in the e-mail, if said e-mail received from said computer network is destined for a facsimile device;
a data acquisition step of acquiring homepage information corresponding to the URL designated in the e-mail, if there is said particular description in the e-mail;
a data conversion step of converting both the homepage information into facsimile data and contents of the e-mail into facsimile data; and
a sending step of sending the facsimile data converted by said data conversion step to a destination based on a destination address of said e-mail,
wherein said data acquisition step comprises:
a page existence confirmation step of detecting whether or not a homepage corresponding to said URL exists, and if said homepage does exist, said data conversion step converts the contents of the e-mail designating the URL corresponding to said homepage and the contents of said homepage into the facsimile data, and said sending step sends the facsimile data converted from the e-mail and said homepage to the destination based on the destination address of the e-mail, and if said homepage does not exist, said data conversion step converts the contents of the e-mail designating the URL corresponding to said homepage into the facsimile data, and said sending step sends the facsimile data converted from the e-mail to the destination based on the destination address of the e-mail.

16. An e-mail system comprising:
mail communication means for sending and receiving e-mails with a computer network;
determination means for whether a received e-mail is destined for a facsimile device;
URL determination means for determining whether or not there is any particular description meaning that a URL is designated in the e-mail, if said e-mail received from said computer network is destined for a facsimile device;
data acquisition means for acquiring homepage information corresponding to the URL designated in the e-mail, if there is said particular description in the e-mail;
data conversion means for converting both the homepage information and contents of the e-mail into facsimile data; and
sending means for sending the facsimile data converted by said data conversion means to a destination based on a destination address of the e-mail,
wherein said data acquisition means comprises:
page existence confirmation means for detecting whether or not a homepage corresponding to said URL exists, and if said homepage does exist, said data conversion means converts the contents of the e-mail designating the URL corresponding to said homepage and the contents of said homepage into the facsimile data, and said sending means sends the facsimile data converted from the e-mail and said homepage to the destination based on the destination address of the e-mail, and if said homepage does not exist, said data conversion means converts the contents of the e-mail designating the URL corresponding to said homepage into the facsimile data, and said sending means sends the facsimile data converted from the e-mail to the destination based on the destination address of the e-mail.

17. The e-mail system according to claim 16, wherein if said e-mail is destined for the facsimile device and does not include said particular description, said data conversion means converts the contents of said e-mail into the facsimile data.

18. The e-mail system according to claim 16, wherein if said the acquired homepage information includes a description having the URL of an auto-transfer destination, said data acquisition means acquires the homepage information on said auto-transfer destination.

19. The e-mail system according to claim 16, wherein if the acquired homepage information includes a description indicating that data in a predetermined format should be downloaded, said data acquisition means does not convert said data in the predetermined format to facsimile data.

20. The e-mail system according to claim 19, wherein if said data in said predetermined format is moving image data, said data acquisition means replaces an area of said moving image data with still image data.

21. The e-mail system according to claim 20, wherein said still image data includes information indicating a data type prior to the replacement.

22. A communication device, comprising:
a mail communication unit that sends and receives e-mails with a computer network;
a determination unit that determines whether a received e-mail is destined for a facsimile device;
a URL determination unit that determines whether or not there is any particular description meaning that a URL is designated in the e-mail, if said e-mail received from said computer network is destined for a facsimile device;
a data acquisition unit that acquires homepage information corresponding to the URL designated in the e-mail, if there is said particular description in the e-mail;

a data conversion unit that converts both the homepage information and contents of the e-mail into facsimile data; and a sending unit that sends the facsimile data converted by said data conversion unit to a destination based on a destination address of said e-mail, wherein said data acquisition unit comprises:

a page existence confirmation unit that detects whether or not a homepage corresponding to said URL exists, and if said homepage does exist, said data conversion unit converts the contents of the e-mail designating the URL corresponding to said homepage and the contents of said homepage into the facsimile data, and said sending unit sends the facsimile data converted from the e-mail and said homepage to the destination based on the destination address of the e-mail, and if said homepage does not exist, said data conversion unit converts the contents of the e-mail designating the URL corresponding to said homepage into the facsimile data, and said sending unit sends the facsimile data converted from the e-mail to the destination based on the destination address of the e-mail.

* * * * *

UNITED STATES PATENT AND TRADEMARK OFFICE
CERTIFICATE OF CORRECTION

| | |
|---|---|
| PATENT NO. | : 7,149,790 B2 |
| APPLICATION NO. | : 10/196256 |
| DATED | : December 12, 2006 |
| INVENTOR(S) | : Sugawara |

It is certified that error appears in the above-identified patent and that said Letters Patent is hereby corrected as shown below:

COLUMN 1:
Line 24, "their" should read -- the --.

COLUMN 3:
Line 62, "Forth" should read -- Fourth --.

COLUMN 8:
Line 38, "received" should read -- receiving --.

COLUMN 9:
Line 52, "[Forth" should read -- [Fourth --;
Line 53, "Forth" should read -- Fourth --.

COLUMN 11:
Line 6, "Forth" should read -- Fourth --; and
Line 42, "Forth" should read -- Fourth --.

COLUMN 12:
Line 17, "case" should read -- the case --; and
Line 67, "inserted" should read -- inserted in --.

COLUMN 13:
Line 8, "of" should read -- or --.

COLUMN 15:
Line 21 claim 14, "coffesponding" should read -- corresponding --.

UNITED STATES PATENT AND TRADEMARK OFFICE
CERTIFICATE OF CORRECTION

PATENT NO. : 7,149,790 B2
APPLICATION NO. : 10/196256
DATED : December 12, 2006
INVENTOR(S) : Sugawara It is certified that error appears in the above-identified patent and that said Letters Patent is hereby corrected as shown below:

COLUMN 16:
Line 37 claim 18, "the" should be deleted.

Signed and Sealed this

Eighteenth Day of March, 2008

JON W. DUDAS
*Director of the United States Patent and Trademark Office*